United States Patent Office 3,082,418
Patented Mar. 19, 1963

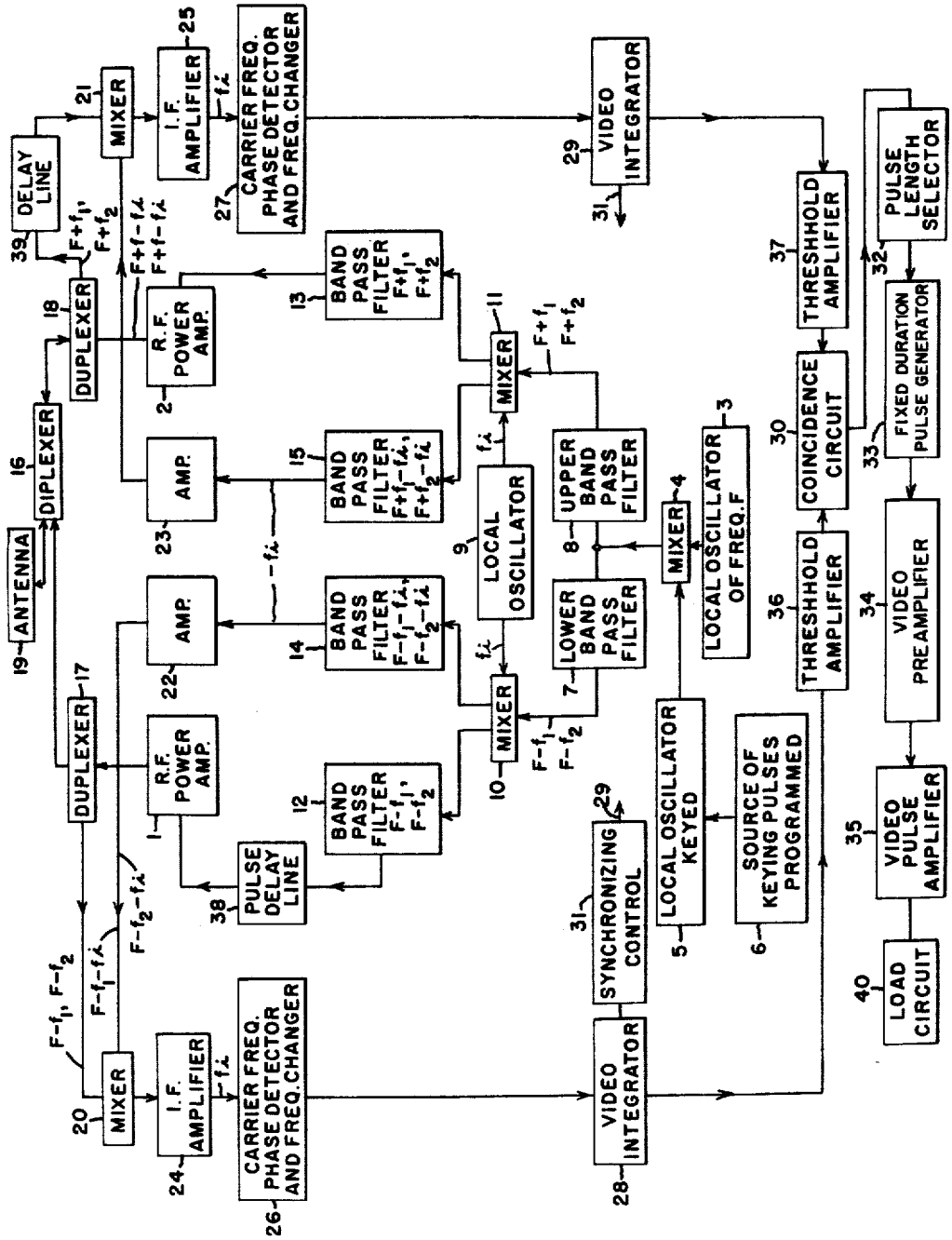

3,082,418
SIGNAL RECEIVER
Ljubimko Milosevic, Paris, France, assignor to Compagnie Francaise Thomson-Houston, Paris, France
Filed July 22, 1958, Ser. No. 750,265
Claims priority, application France July 25, 1957
1 Claim. (Cl. 343—11)

The present invention concerns a receiver for pulses which is made relatively insensitive to noise or jamming signals by a process involving integration.

The functioning of conventional receivers employing integrating systems is seriously affected in the case of severe jamming. This results from the fact that the majority of the integrators known today function in a continuous fashion and that their output voltage may contain parasitic impulses of large amplitude even though the average amplitude of these impulses is very weak.

The object of this invention is to provide a receiver not having this fault. Briefly, the receiver is composed of an integrator which samples the signal applied to its input terminals during short periods of time and then produces one or more impulses of a duration equal to the period of the sampling and of an amplitude equal to the sum of a predetermined number of said successive sampled impulses.

An integrator of this type is disclosed in the French Patent Number 1,179,873 entitled, "A New System For The Elimination of Noise."

When the frequency of the jamming signals varies very rapidly, this shock excites the receiver circuits including the antenna coupling circuits associated with the receiver. It follows, therefore, that damped parasitic oscillations are produced and that these new parasitic components appear at the output of the receiver. The duration of this perturbation is inversely related to the bandwidth of the high frequency elements that are excited. As a result, it is common practice to reduce the risks of shock excitation, by employing a radar whose high frequency elements, antenna, waveguides and those associated with the receiver as well as the latter have a very large pass band.

A radar having a very large band pass must emit extremely short impulses in order to have a satisfactory sensitivity. In addition, the peak power of the transmitter must be very high for the range of the radar to be adequate.

If the magnitude $B$ of the band of the receivers is for example of the order of several tens of megacycles per second, it is known that the optimum duration $\tau$ of the pulses lies between $$\frac{120}{a} \text{ milli-microseconds}$$

or $$\frac{120}{a} \times 10^{-9} \text{ seconds}$$

and $$\frac{200}{a} \text{ milli-microseconds}$$

$$a = \frac{\text{bandwidth } B}{10 \text{ megacycles}}$$

or that $$2\tau > \frac{1}{B} > 1.2\tau$$

In order that a radar emitting short impulses have a satisfactory range, it is necessary to have an instantaneous power of several tens of megawatts. Transmitting tubes and circuits currently used do not readily permit such performance.

The use of an integrator in accordance with this invention permits one to enjoy a desired sensitivity of the radar, corresponding to an optimum ratio of $$\frac{B}{\tau}$$

while the pulse duration is sufficiently great that the peak power of the transmitter is not prohibitively large.

In accordance with one embodiment of the invention, a radar jammable with difficulty is composed of two transmitters and two receivers. The voltages produced by the integrators of the receivers are respectively applied to two input terminals of a multiplier circuit, whose output is the product of said voltages. One eliminates, by this technique, the disturbances due to noise which do not appear simultaneously in the outputs of the integrators. In the course of one radar pulse period, each detected obstacle gives rise to two echo signals. One pulse corresponds to each of the echoes appearing in the output circuit of each integrator. Each echo is applied to one of the pairs of input terminals of the multiplier circuit. To insure that the integrator output pulses occur simultaneously, the integrators need to be synchronized. In accordance with a preferred embodiment, the parasitic voltage produced by the multiplier circuit is reduced substantially when a disturbance due to noise appears at the output terminals of one of the integrators, while the voltage produced at the output of the other integrator does not contain components due to low frequency noise. To accomplish this, there is employed the teaching of the procedure whose object was the French Patent Number 1,165,654 entitled, "Improvements to a Circuit Permitting the Multiplication of an Electric Magnitude by Another." It consists in coupling the output circuit of each integrator to one of the input circuits of the multiplier by means of amplifiers which do not transmit signals of an amplitude lower than a value slightly greater than the maximum noise level.

From theoretical considerations which will be made clear during the course of this description, it can be shown that the functioning of a radar of this type is made substantially insensitive to jamming. In order that jamming be effective it is necessary that the frequency variation of the jammer be regulated with precision such that its time of passage from one transmitter to the other frequency of the transmitter be in the neighborhood of the duration of one radar pulse period. Moreover, the pulse recurrence rate may be changed from pulse to pulse period.

In order to understand more fully the technical characteristics of this invention, it is necessary to describe the arrangement illustrated by the single drawing.

The radar system which the figure represents comprises two transmitter-receivers which function on two different wave lengths and have the same pulse repetition frequency.

Each of these emitters or transmitters has a high frequency amplifier 1 or 2. The potentials applied to the input terminals of these are produced from the output signals of oscillator 3 at a frequency of functioning F. This voltage is applied to one of the circuits at the input of a mixer 4 of which the other circuit input is coupled to an oscillator 5 functioning successively at two frequencies $f_1$ and $f_2$. The keying circuit 6 directs the operation of the oscillator following a predetermined law or a chance variation.

The input circuits of two pass band filters 7 and 8 are coupled to the output circuit of mixer 4. The characteristics of these filters are such that they will transmit respectively the components of the frequencies $F-f_1$, $F-f_2$ and $F+f_1$ and $F+f_2$ of the applied voltage in their input terminals.

A second oscillator 9 has for its functioning frequency the intermediate frequency $f_i$ of the radar receiver. Its voltage output is applied to one of the pairs of the input terminals of mixers 10 and 11, of which the second input circuits are coupled to filters 7 and 8. The output voltages of the mixers 10 and 11 are respectively applied to filters 12, 14 and 13, 15. The pass bands of the filters 12 and 13 are analogous to those filters 7 and 8. The filter 14 transmits the components of the voltage of the output of mixer 10 whose frequencies are $F-f_1-f_i$ and $F-f_2-f_i$. In the same manner for filter 15, it transmits the components of frequency $F+f_1-f_i$ and $F+f_2-f_i$ of the output of voltage of the mixer 11.

As has already been explained, the filters 12 and 13 are, respectively, coupled to high frequency amplifiers 1 and 2. The output circuits of these are coupled to the entrance to the input branches of one of the guides to a high frequency hybrid or a rat race 16 by the duplexers 17 and 18. One end of the second guide of this hybrid or rat race is coupled to the antenna 19 of the radar.

The antenna 19, the receivers which will be described later on, and the waveguides joining them have a large pass band, which may be several tens of megacycles per second for example. One effectively avoids, as well as the reception of undesirable signals of rapidly varying frequency, not only shock excitation but the appearance of composite parasitics of large amplitude in the output circuits of the intermediate frequency amplifier.

The mixer circuit 20 is supplied with the output signal from amplifier 22 and the output signal of duplexer 17. The mixer circuit 21 is supplied with the output signals from amplifier 23. Additionally the output of duplexer 18 is applied to mixer 21 through delay line 39.

The output potentials of the mixers are applied to the input terminals of intermediate frequency amplifiers 24 and 25. The output circuits of these amplifiers are coupled to input circuits of devices 26 and 27 which transform echowave train oscillations into pulses devoid of I.-F. components, while signals due to noise are converted into wave trains of relatively low frequencies. Each of these devices 26 or 27 consists of a correlation system or a phase detector for example. The output voltages of the devices 26 and 27 are applied to the input of the integrating circuits 28 and 29. The pulses produced by these are transmitted to the inputs of a frequency multiplication circuit.

Each of the mixers 20 and 21 comprises two mixers preceded of a filter of the diplexer type which separates the frequencies $F-f_1$ and $F-f_2$ (or $F+f_1$ and $F+f_2$). Each of the mixers is followed by an I.F. amplifier.

The carrier frequency phase detector and frequency changer 26 acts in the same way as the coincidence circuit 30.

It is preferred to use integrators of the type described in the French Patent Number 1,179,873, previously cited. The use of these integrators permits the restoration of the sensitivity of the radar which would be weak if these wide-band receivers contained an integrator of the conventional type. It has already been explained that these integrators sample the signal applied to this circuit input into short pulses of identical length, and afterwards produce one or more short pulses of length equal to the period of sampling and of an amplitude equal to the sum of the amplitudes of a predetermined number of the aforesaid successive impulses. When two useful impulses simultaneously produced by the devices 26 and 27 are applied to the integrating systems 28 and 29, the leading edge of the very short impulses produced by these integrators depends on the instance when the sampling operation is performed by each integrator. It is necessary that these very short impulses be simultaneous. In this condition, their application to the input circuits of the coincidence circuit 30 determines the appearance, at the output, of an impulse of maximum duration. In order that this be so, the functioning of the integrators must be synchronized by a synchronizing circuit 31.

A pulse length selector 32 connected in series with the circuit 30 eliminates all parasitic impulses transmitted by the coincidence circuit which does not have the same duration as a useful impulse. The circuit 32 is coupled to a preamplifier stage 34 in the video frequency chain 35 by a device 33 which is a regenerator of pulses of useful length.

In a preferred embodiment, the integrators are not directly coupled to the input circuits of the coincidence circuit 30. There is interposed between the integrators and the coincidence circuit, amplifier circuits 36 and 37 which do not transmit signals of an amplitude less than a threshold level slightly greater than the maximum level of the low frequency noise. Use of threshold amplifiers 36 and 37 may not be required in all applications.

As has already been detailed, this procedure permits the reduction of the amplitude of the output voltage of the multiplication device whenever a disturbance is transmitted by one of the integrators, while the voltage produced by the other integrator contains only those components due to the noise. The procedure in question is described in the description of the previously cited French Patent Number 1,165,654.

It will be noted that if one desires to increase the difficulty of jamming, one may employ a delay line 38 between the filter 12 and the amplifier 1, and a second delay line 39 between the duplexer 18 and the frequency changer 21. The transmission delays of the signals transversing the two lines 38 and 39 must be equal. Line 38 delays on transmit and line 39 delays on receive.

It will be noted that it is not possible to predict exactly the initial instant of reception of an echo wave after the initial instant of the corresponding transmitted impulses produced by the integrators 28 and 29. The uncertainty of this initial instant may be reduced to a magnitude $$\frac{+ \text{ or} - \theta}{2}$$

$\theta$ being the duration of the pulse emitted. This results, in general, in a negligible error in the measurement of distance to an object, especially in the case where the pulses emitted are of the order of one microsecond duration. This error is the order of + or −75 meters.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claim is therefore intended to cover and embrace any such modifications within the limits of the true spirit and scope of the invention.

What I claim and desire to secure by Letters Patent of the United States is:

In combination first and second means for transmitting pulses at a common repetition rate towards a remote object, said first means sequentially transmitting pulses of a frequency $F-f_1$ and $F-f_2$, said second means transmitting sequentially pulses of a carrier frequency $F+f_1$, and $F+f_2$, first means for receiving sequential pulses of a frequency $F-f_1$ and $F-f_2$ returned from said object, second means receiving sequential pulses of a frequency $F+f_1$ and $F+f_2$ returned from said object, each of said receiving means comprising means for converting said sequential pulses to a common frequency $f_1$, means to phase detect the sequential pulses, first and second integrating means connected respectively to said first and second receiving means, and multiplying means for providing an output signal connected to the outputs of said first and second integrating means.

References Cited in the file of this patent
UNITED STATES PATENTS

| | | |
|---|---|---|
| 2,676,317 | Purington | Apr. 20, 1954 |
| 2,817,832 | Mathes | Dec. 24, 1957 |
| 3,018,477 | Brault et al. | Jan. 23, 1962 |

UNITED STATES PATENT OFFICE
CERTIFICATE OF CORRECTION

Patent No. 3,082,418                March 19, 1963

Ljubimko Milosevic

It is hereby certified that error appears in the above numbered patent requiring correction and that the said Letters Patent should read as corrected below.

Column 5, line 8, for "$f_1$" read -- $f_i$ --.

Signed and sealed this 26th day of November 1963.

(SEAL)
Attest:
ERNEST W. SWIDER             EDWIN L. REYNOLDS

Attesting Officer             Acting Commissioner of Patents